United States Patent [19]

Schurrer et al.

[11] 3,926,053
[45] Dec. 16, 1975

[54] APPARATUS FOR NON-CONTACT, ACCURATE AND CONTINUOUS DETERMINATION OF SURFACE TEMPERATURE ON A PART

[75] Inventors: Josef Schurrer, Karlsfeld; Josef Meyer, Olching, both of Germany

[73] Assignee: Maschinenfabrik Augsburg-Nurnberg Aktiengesellschaft, Germany

[22] Filed: Aug. 22, 1973

[21] Appl. No.: 390,486

[30] Foreign Application Priority Data
Aug. 22, 1972 Germany............................ 2241107
Aug. 22, 1972 Germany............................ 2241108

[52] U.S. Cl. .................. 73/351; 73/344; 324/34 D; 324/61 R; 324/175
[51] Int. Cl.² ..................... G01K 13/08; G01K 7/00
[58] Field of Search ............ 73/344, 351; 324/34 D, 324/34 PS, 61 R, 175

[56] References Cited
UNITED STATES PATENTS

| | | | |
|---|---|---|---|
| 1,960,168 | 5/1934 | Schoenberg.................. | 324/61 R |
| 2,556,841 | 6/1951 | Farnell........................... | 73/351 X |
| 2,991,654 | 7/1961 | Engelhard..................... | 73/351 X |
| 3,194,055 | 7/1965 | Knobel.......................... | 73/37.5 |
| 3,295,842 | 1/1967 | Stelling et al................. | 73/351 X |
| 3,317,125 | 5/1967 | Holden........................... | 73/351 UX |
| 3,400,331 | 9/1968 | Harris............................ | 324/61 R |
| 3,400,587 | 9/1967 | Franck........................... | 73/343 R |
| 3,427,882 | 2/1969 | Wagner.......................... | 73/351 |
| 3,575,129 | 4/1971 | Sullivan......................... | 324/175 UX |
| 3,589,192 | 6/1971 | Sabovik......................... | 73/344 |
| 3,684,961 | 8/1972 | Muir............................... | 324/34 D |
| 3,723,748 | 3/1973 | Coburn et al................. | 324/175 X |
| 3,729,047 | 4/1973 | Bohnlein et al.............. | 324/175 X |

*Primary Examiner*—Richard C. Queisser
*Assistant Examiner*—Frederick Shoon
*Attorney, Agent, or Firm*—Craig & Antonelli

[57] ABSTRACT

Apparatus for non-contact, accurate, and continuous determination of the surface temperature on a rotatable part which includes a sensing probe unit containing detecting means for both temperature and distance. The probe unit is constructed such that the distance sensed and the temperature measured are taken at the same point or location on a rotating part. In one preferred embodiment, the temperature sensing element is in direct contact with an electrode for a capacitive excursion measurement system, such that the heat sense is necessarily at the same spacing from the rotor as is the capacitance electrode for measuring the distance from the surface of the rotatable part. Another preferred embodiment utilizes concentrically arranged conductive excursion elements and thermal detector radiation plate. Further, the probe carrying the temperature and distance measuring elements is connected at a housing 1 of the housing around the rotatable part by way of a flange, which has a micrometer screw attached to a slidable member fixed to the probe for varying the mean or null position of the probe with respect to the path of rotation of the surface of the rotatable member. Other preferred embodiments include further photoelectric speed detecting means arranged concentrically with both the temperature and distance measurement devices so as to also detect the speed at the same location as the temperature and distance.

42 Claims, 10 Drawing Figures

APPARATUS FOR NON-CONTACT, ACCURATE AND CONTINUOUS DETERMINATION OF SURFACE TEMPERATURE ON A PART

BACKGROUND AND SUMMARY OF THE INVENTION

This invention relates to apparatus for non-contact, accurate and continuous determination of surface temperature by means of capacitive and/or inductive excursion or distance measuring means and temperature detecting elements.

A previously contemplated non-contact method of determining surface temperature utilizes probes to detect thermal radiation for evidence of surface temperature. This method is accurate only so long as the distance between the thermal probe and the surface is precisely known. The measurement of this distance, however, is difficult especially when it is to be continuous and non-contact particularly on parts moving in the direction the measurement is made (i.e., parts which continuously change position with respect to a fixed thermal probe).

This invention contemplates providing apparatus for maximally accurate, non-contact and continuous measurement of surface temperature.

More specifically, the present invention contemplates providing apparatus in which temperature and excursion detecting elements form a common probe opposite or facing the surface, the temperature of which is to be determined. The apparatus of this invention provides continuous determination of simultaneously the thermal radiation and the distance from the surface as sensed relative to the same spot on the surface so that these data may be fed into a computer for direct and continuous evaluation by means of an analog circuit which reflects the quadratic function between the intensity of radiation and distance. The details of such a computer are dispensed with herein because computers of conventional construction can be utilized to practice the invention by one skilled in the art, given the present disclosure.

It is especially with moving parts, such as the surface of a gas ultracentrifuge where only very precise knowledge of the temperature profile will permit certain correct inferences to be made as to the separation process taking place in the interior of the centrifuge, that the apparatus of this invention is the only practical means for measuring the exact mean temperature of a contour line, since centrifuge rotors are subject to pronounced precession and nutation motion in service.

In a further aspect of this invention, the detecting elements are given annular or disk shape and are arranged concentrically to one another. This annular concentric arrangement is of advantage inasmuch as both the temperature and distance detecting elements can then make their measurements at exactly the same spot on the surface rather than take the measurement at two closely adjacent points.

In a still further aspect of this invention the distance between the probe and the surface can be varied, which admits of two possibilities:

a. The output of the excursion detecting element can be compared with the calibrated against defined positions, which makes for economical manufacture at liberal tolerances; and b. The excursion detecting element can be moved towards the surface as far as it will still withstand the thermal radiation. Since thermal radiation diminishes as the square of the distance, two heat sources of different intensities will at a great distance both produce a value that will range below a measurable magnitude, whereas two different values will be measured when the distance is sufficiently reduced. In this manner the measurable fluctuation in radiation accompanying a fluctuation in heat or temperature to the surface will be the more pronounced the more closely the probe is brought to the surface.

In a further aspect of this invention the probe is variable by an adjustable and readable distance from its original null position. This enables the probe to be set in service to different, defined distances which can each be calibrated with an associated signal from the excursion detecting element. This will likewise enable a more accurate determination to be made of the gradual heat growth on the surface by means of step-by-step adaptation of the measuring section than would be possible if the measuring distance were fixed. That is, the probe can be moved between different predetermined null positions to optimize temperature determination at various heat levels at the surface. Finally, when the measuring mode is reversed, a mechanically measured measuring section can be related to a standard signal from the excursion detecting element. In an especially advantageous aspect of this invention a micrometer screw having a reading scale is designed into the apparatus as a tool for accurately varying and reading the measuring section.

In a further aspect of this invention the apparatus is inserted in a wall adjacent to the surface such that the detecting elements are on that side of the wall which faces the surface while the micrometer screw and its reading scale are arranged on the other side, where in a still further aspect of this invention the signal lines extending from the detecting elements terminate in detachable half couplings arranged near the micrometer screw. This aspect of the present invention not only enables the apparatus to be seated in a wall such that its manipulated parts are protected from radiation and other effects, but it also enables all signal connections to be connectably arranged on the protected side of the wall. These coupling connections will further facilitate assembly and wiring work and will permit rapid changes of apparatus to be made in the event of its malfunction.

In an additional aspect of this invention the apparatus is sealed into the wall of the recipient or housing of a gas ultracentrifuge, and this is where the apparatus of this invention provides especially satisfactory measurement as it would wherever such measurements must be made in inaccessible interior spaces or in areas of relative or positive pressure. It is chiefly the modest differences in temperature and the changes in measuring section as a result of gyroscopic motions of the centrifuge rotor that have heretobefore prevented accurate temperature measurements; and it is the comparison made in accordance with this invention between the measured length of measuring section and the sensed intensity of radiation which now enables accurate evidence of the surface temperature of centrifuge rotors.

In a further aspect of this invention the signal from the excursion detecting element is made available for additional service at a multiple connection, particularly at the take-off or half coupling. In the case of gas ultracentrifuges where positional measurement other than for surface temperature determination is required, e.g., in sustaining the operation of an active magnetic bearing, the positional measurement function can additionally be served by the apparatus of this invention due to this multiple connection. Inasmuch as the recipient or housing is exposed to external compressive forces on the one hand and to the great momentum of the centrifuge rotor if it should burst on the other, it will be desirable to minimize the number of lead-ins in the recipient wall.

The present invention further contemplates providing measuring apparatus for making at least position and speed measurements free of mechanical contact at a single location on the surface.

This invention particularly contemplates providing apparatus in which a light conductor of a photoelectric measuring device forms a structural unit together with further detecting elements suitable for measurements on moving parts.

Gathering several detecting elements into a common, structurally unified measuring apparatus according to the present invention, provides an important advantage generally and more particularly for inaccessible moving parts in that:

a. Associated test points permit associated measuring data to be picked off a single location. The risk of confusion which harasses experimental work especially and the loss of time involved in making the various test points to correspond one to the other are therefore eliminated.

b. A permanently set, structurally unitarily combined measuring apparatus makes it possible for the spatial correspondence between speed and distance measurements to be interchangeably the same everywhere.

c. Since a defined location must be related to each test point, especially to each distance test point, structural unification results in a substantially smaller number of precisely arranged bearing surfaces of the probes, and d. Where individual moving parts in casings, especially rotational bodies such as in a gas centrifuge, especially when such casings are under pressure, require such measurements, each separate probe necessarily entails a degradation in the strength of the stressed casing wall especially with gas centrifuges where the casings serve a containing function to protect the environment from fragments should the centrifuge rotor burst. The aggregation of associated test points into a single structural unit reduces the number of lead-ins in the casing wall and so weakens the wall to a less degree.

In a further aspect of this invention the detecting elements are arranged in close proximity of the moving part and on that face of the light conductor which lies opposite the scanning unit. Inasmuch as these are non-wearing detecting elements, such as a photoelectric cell and an incandescent light bulb on the scanning unit at the end of the light conductor, it will be desirable to place them in an area of optimum distance from the moving part where they obtain the best possible measuring data. Commonly assigned copending U.S. Pat. application Ser. No. 231,489, filed Mar. 3, 1972, the disclosure of which is incorporated herein by reference, describes an arrangement for placing the light conductor at desired positions.

In a further aspect of this invention the detecting elements grouped at the end of the light conductor serve to measure temperature and distance, where they operate capacitively or inductively for measuring distance while for sensing temperature, use is made of thermocouples, thermistors, NTC resistors or similar provisions. Inasmuch as the thermal profile is an important index of the performance of a moving part, and inasmuch as it provides, in the particular case of gas centrifuges, evidence of the separation process taking place in the interior of the centrifuge rotor, a further advantage of the present invention is seen to lie in the allocation of temperature detecting elements to the measuring apparatus of this invention.

In a further aspect of this invention at least the detecting element for distance measurement is annularly arranged around or in front of the end of the light conductor. The particular advantage of this further aspect of this invention lies in that the distance measurement is representative of the distance prevailing at exactly the speed test point. With capacitive distance measurement, the light conductor should not penetrate the diaphragm-like opening in the distance detector so as not to adversely affect the uniform permitivity needed for capacitive distance measurement.

In a further aspect of this invention a structural unit containing the detecting elements (for distance and thermal measurements) and the light conductor is sealed into a wall adjacent to the moving part, where the detecting elements are arranged on that side of the wall which faces the moving part and where the light conductor and the outgoing detector signal lines within the structural unit penetrate the wall through gastight passages and terminate in coupling halves which promote the rapid coupling or renewal of conducting and detecting elements. It is especially with gas centrifuges that perfect sealing is desired of the structural unit carrying the measuring elements. The signal lines for the detecting element signals are therefore all routed in the interior of the structural unit so that the need for separate gastight passages to route them through the wall, too, is eliminated. Thus, when leakage occurs within the structural unit or a signal line is disrupted or damaged, it will be sufficient to replace the entire structural unit with no need to separately replace or seal signal lines. The rapid uncoupling of the scanning unit and/or further signal lines from the outer side of the structural unit shortens repair and wiring times and prevents confusion during wiring.

These and other objects, features and advantages of the present invention will become more apparent from the following description when taken in connection with the accompanying drawings which show, for purposes of illustration only, several embodiments in accordance with the present invention, and wherein.

DETAILED DESCRIPTION OF THE DRAWINGS

Figure 1:
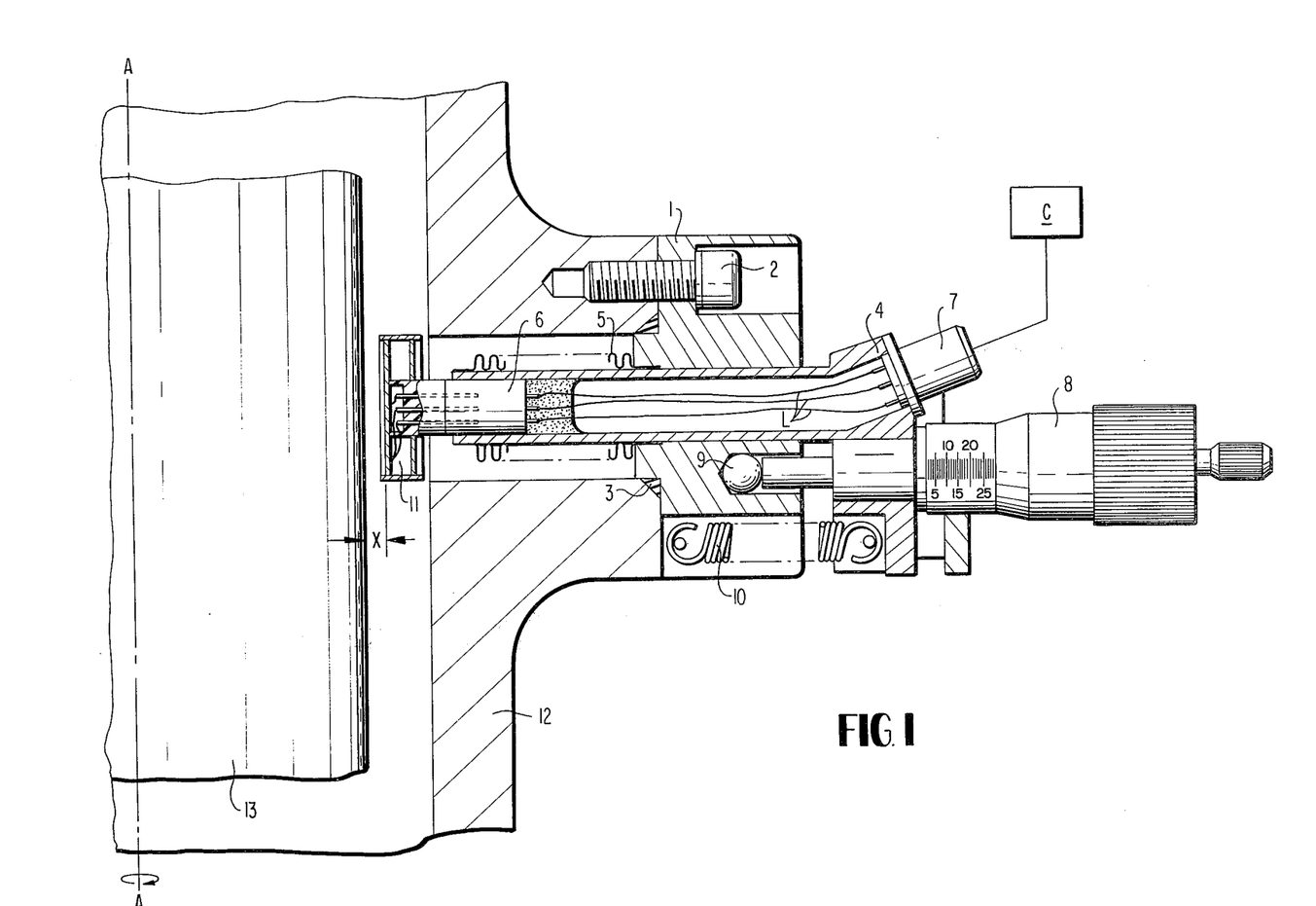
FIG. 1 is a partial sectional schematic view illustrating portions of a gas centrifuge with temperature and position measuring apparatus arranged in accordance with a preferred embodiment of the present invention.

FIG. 1 illustrates portions of a gas centrifuge having housing or recipient wall 12 in surrounding relationship to rotatable centrifuge rotor 13 which rotates about axis A—A. The surface temperature of rotor 13 is to be determined utilizing temperature and distance measuring or detecting elements in probe 11 which is spaced from the mean or average path of rotation of the surface of rotor 13 by a distance "X".

A flange 1 is secured opposite the rotor 13 to the wall 12 of the recipient or housing with three screws 2. Gas leakage is prevented by an O-ring 3 inserted between the flange 1 and the wall 12 of the recipient. A sliding member 4 sealed against gas leakage by a bellows 5 is inserted for axial movement (movement transverse to axis A—A of rotor 13) centrally in the flange 1. Cast into the inner end of the sliding member 4 is a gastight jack 6 which electrically connects to a multiple plug 7. Firmly connected to the sliding member 4 is also an arrestable micrometer screw 8 the spindle of which rests against a ball 9 and the edge of which accommodates a reading scale. Seating force for micrometer screw 8 is provided by a tension spring 10 attached to flange 1. The distance read off the scale corresponds to the distance covered by a probe 11. The probe 11 is retained by virtue only of the grip of the detachable plugged connection with jack 6 so that probe 11 is movable with slide member 4.

Figure 2:
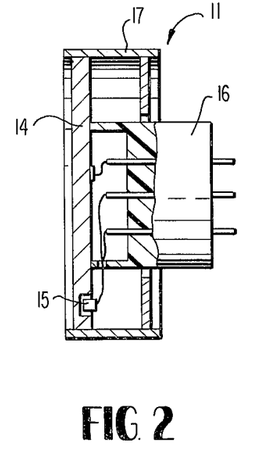
FIG. 2 is an enlarged sectional view of a first embodiment of a measuring probe constructed in accordance with the present invention.
Figure 3:
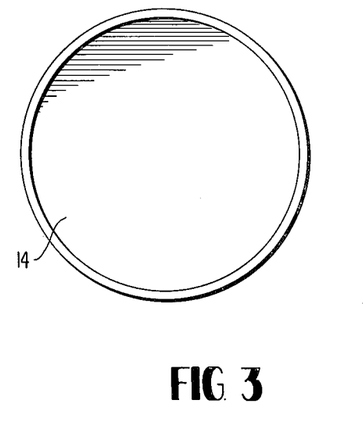
FIG. 3 is a front view of the probe of FIG. 2.

FIGS. 2 and 3 are enlarged views of probe 11 and show an electrode 14 for capacitive excursion measurement on which is seated an insulated temperature detecting element 15 which may be a thermocouple, a thermistor or an NTC resistor. The rear side of the probe or sensor accommodates a multiple plug 16 which retains it in position when coupled to a jack such as jack 6 of FIG. 1. A mirrored surface 17 protects the probe from interference by radiation such as by thermal radiation from wall 12 which could adversely effect the accuracy of temperature measurements.

In the arrangement of FIG. 1, when using a probe 11 as in FIG. 2, the temperature and distance measurements are continuously and simultaneously taken from the same location on the surface of rotor 13. Signal lines L extend on the inside of sliding member 4 to said multiple plug 7. In this manner, the distance and temperature signals are transmitted through wall 12 without requiring added apertures or seals in the wall 12. These temperature and distance signals are then transferred from plug 7 to a computer (only schematically depicted as C) where the detected temperature and distance signals are processed to determine the actual surface temperature at the rotor. Since the relationship of the thermal measurements at the probe 11 to the actual temperature at the surface of rotor 13 are a quadratic function of the distance "X" between the probe and the surface of the rotor (any changes in distance "X" being supplied as signals from the capacitive excursion electrode) the computer C will continuously apply the quadratic function to determine the actual surface temperatures. Since computers of known construction could be utilized by one skilled in the art to operate on these signals as described, given the present application disclosure, the details of such computer are not included herein in order not to obscure the disclosure of the present invention. It will also be understood that the computer C will furnish an output signal indicative of the derived rotor surface temperature, which output signal may be further processed to determine flow phenomenon inside the centrifuge and the like.

Figure 4:
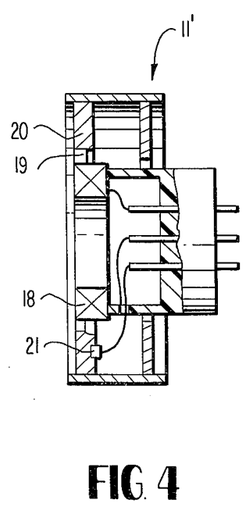
FIG. 4 is an enlarged sectional view of a second embodiment of a measuring probe constructed in accordance with the present invention.
Figure 5:
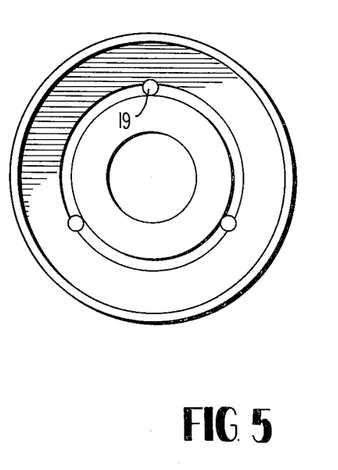
FIG. 5 is a front view of the probe of FIG. 4.

FIGS. 4 and 5 illustrate a modified probe or sensor 11' having an indicative excursion detecting element 18 which connects through three insulators 19 to an annular thermal radiation detector 20 which communicates the volume of heat received to a temperature detecting element 21. Since the insulators insulate electrically and thermally, the attachment of the temperature detecting element 21 need not be insulated. According to another preferred contemplated arrangement (not illustrated) of the present invention, the excursion measuring system 18 incorporates a centrally disposed additional detecting element, such as an additional capacitive excursion detector for comparative measurement. This last-mentioned arrangement provides for a redundant measurement of the distance X at the same point or location on the surface of the rotor as does the element 18 and detector 20.

The probe 11' of FIG. 4 operates in substantially the same manner as described above for probe 11 when used in the arrangement of FIG. 1 in place of probe 11.

Figure 6:
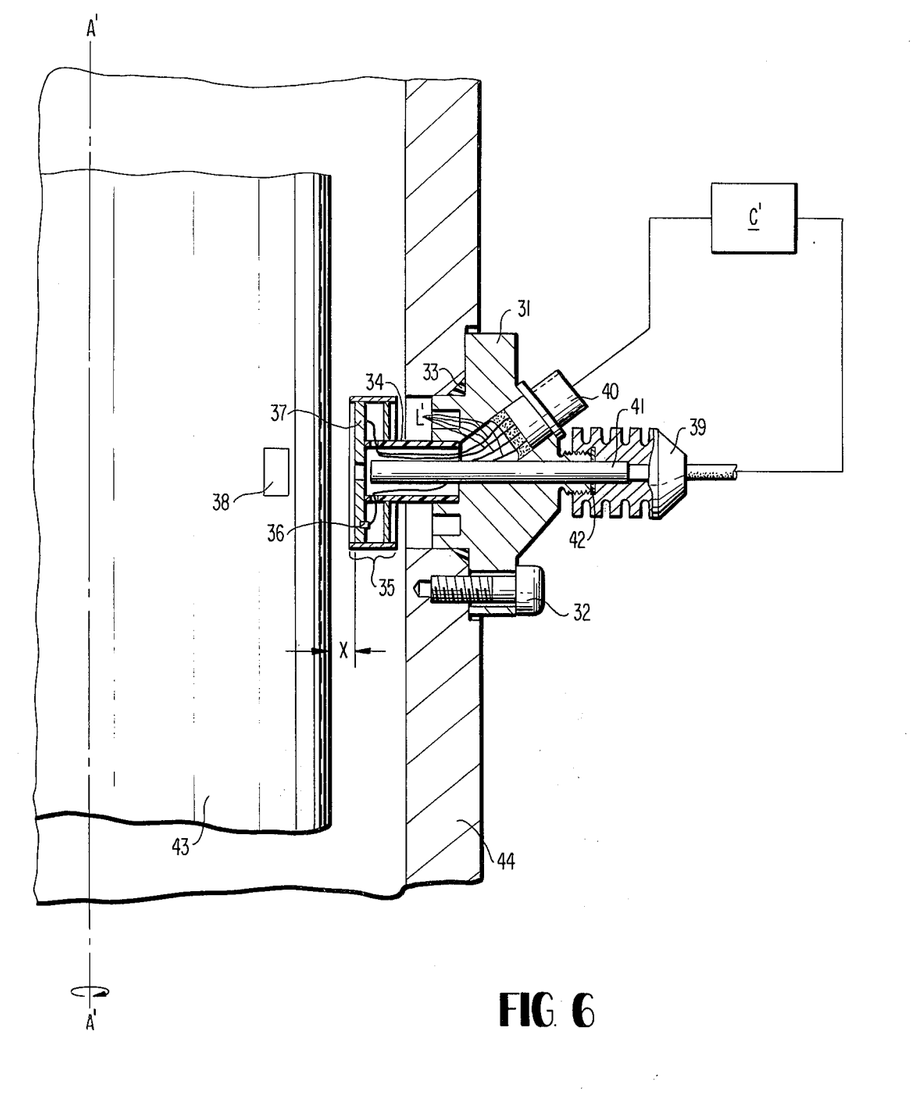
FIG. 6 is a partial sectional schematic view illustrating portions of a gas centrifuge with temperature and position measuring apparatus arranged constructed in accordance with a further preferred embodiment of the present invention.

FIG. 6 is a view similar to FIG. 1 which shows another preferred arrangement of the present invention which is generally similar to the arrangement of FIGS. 1–4 with the additional provision of a photoelectric speed detecting device for detecting the speed of the rotor 43 by way of a light conductor arranged concentrically to the distance and temperature measuring elements at a common probe. In this FIG. 6 arrangement all measurements are made from the common probe such that all measurements are at the same point on contour line of the rotor surface. In this manner, the relationship between distance X and speed of rotation of rotor 43 are always precisely correlated. Rotor 43 rotates about axis A'—A'.

A centrifuge rotor 43, revolves in a recipient or housing having wall 44. Seated in a hole of wall 44 is a flange 31 attached to the wall 44 with screws 32. O-ring 33 seals the connection between flange 31 and wall 44 to prevent gas leakage. An insulator 34 carries probe 35 with detecting element for temperature 36 and distance 37. A contrast marking 38 on the surface of rotor 43 is scanned by a light conductor 41 through a centrally disposed hole in the probe 35. The light conductor rod 41 is cemented into position in flange 31 for gastight sealing, with additional sealing provided by an O-ring 42. A photoelectric scanning head 39 is disconnectably connected in accordance with the described arrangement in the above-identified co-pending application Ser. No. 231,489, wherein the scanning head includes a light source which may be a bulb as is conventional in the art, and a light receiver or detector which may be a photoelectric cell.

The distance and temperature signals are routed by lines L' to a multiple plug 40 which is cast into place for gastight sealing. The distance X between the probe and the centrifuge rotor can be varied by inserting seals (shim means) between the flange 31 and wall 44.

Figure 7:
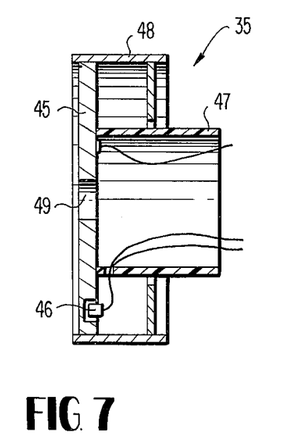
FIG. 7 is an enlarged sectional view of a further embodiment of a measuring probe constructed in accordance with the present invention.
Figure 8:
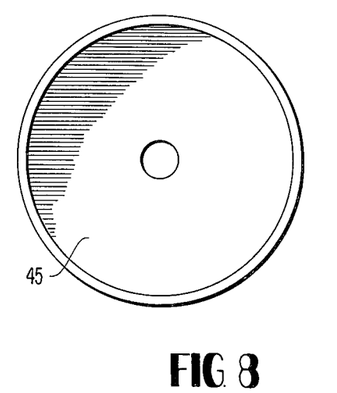
FIG. 8 is a front view of the probe of FIG. 7.

FIG. 7 illustrates a probe 35 in enlarged sectional view. The probe contains an electrode 45 for the capacitive measurement of distance which has a diaphragm-like centrally arranged opening 49. An insulated temperature detecting element 46 is attached to the electrode 45. Arranged on the rear side of the probe 35 is an insulated, possibly slotted tube 47 which serves to insert the probe 35 in a hole in the flange 31. A mirrored surface 48 protects the probe from radiation emitted by the recipient wall 44.

In the arrangement of FIGS. 6 and 7, the temperature, distance, and speed measurements are all taken continuously and simultaneously at the same place or contour on the moving rotor 43 due to the concentric arrangement of the detecting elements and the light conductor end face (conductor 41 being in alignment with opening 49 of probe 35). The output signals representing temperature and distance measurements are transferred by way of lines L' to plug 40 in a manner analogous to that described above for lines L of FIG. 1. These temperature and distance signals are then transferred to schematically depicted computer C' for processing to determine surface temperature conditions (see discussion above regarding computer C of FIG. 1). The signals from scanning head, which represent speed of rotor 43, are also supplied to computer C' for processing in conjunction with the other signals. Since the invention relates primarily to the means for obtaining the accurate temperature, distance and speed signals by the specific arrangement of detecting elements, and not to the means for processing these signals, and further since signal processing means, such as analog computers, are known which could utilize these signals, the details of computer C' and the output thereof are not included herein.

Figure 9:
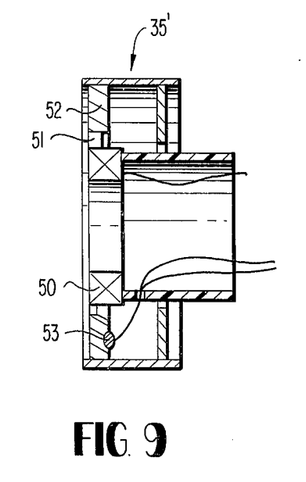
FIG. 9 is an enlarged sectional view of a still further embodiment of a measuring probe constructed in accordance with the present invention.
Figure 10:
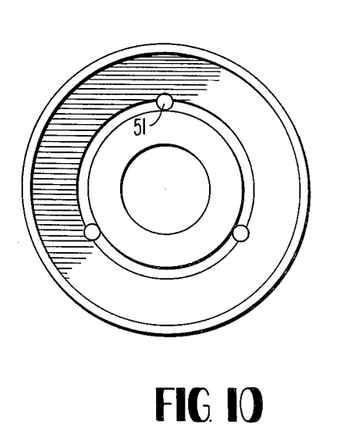
FIG. 10 is a front view of the probe of FIG. 9.

FIG. 9 illustrates a modified probe 35' which includes an inductive excursion detector system 50 which is arranged in the shape of a coil around a tubular member which here represents the diaphragm (opening for light from conductor 41). This excursion detecting system 50 is concentrically separated from a likewise annular temperature radiation detector 52 by means of three insulators 51, where the radiation detector communicates the heat it absorbed to the temperature detecting element 53. This FIG. 9 probe 35' can be substituted for probe 35 in FIG. 6 and operates in a substantially similar manner to effect a simultaneous detection of temperature, distance and speed at the same location on the rotor surface due to the concentric arrangement of the respective detecting elements.

It is further noted that the present invention contemplates using features from one of the above-described preferred embodiments in conjunction with other of said embodiments. For example, the photo-electric speed measuring system of FIG. 6 could also be used with the micrometer adjustable probe of FIG. 1.

Since the circuitry and specific structure for the capacitive and inductive distance measuring elements, the temperature detecting elements, and the photoelectric speed measuring device could be constructed by one skilled in the art, given the present disclosure, using known elements and arrangements, the details thereof have been excluded herein in order not to obscure the invention.

Instrumentation units that could be used with the present invention are available as off the shelf equipment from several manufacturers, such as the firm DISA, of Copenhagen, Denmark. Temperature measuring could be done with measuring subassemblies made by HARTMANN and BRAUN, of Frankfurt, West Germany. Measurement of the speed by the photo-electric means can be done with a normal photocell and a normal electronic counter. Measuring computers for amplifying and comparing the signals sent out by the measuring sensors, are made and sold for example by the firms SPECTRAL-DYNAMIX of San Diego, California or SHENK, of Darmstadt, West Germany.

With respect to the calibration and utilization of the excursion detecting elements, the following is noted. Assuming a measuring amplifier and a sensor connected thereto, the output of the amplifier will exhibit a certain voltage in relation to the distance between the measuring surface and the sensor. A standard voltage, for example, one volt, may be chosen and the distance adjusted until the output of the amplifier produces exactly this standard signal of one volt. One can then determine by actual separate measurement of the distance, the distance corresponding to the one volt signal, and thereby, by repeating this process for different distance and voltage magnitudes, calibrate the excursion detecting system. The actual determination of the distance can be done either by maintaining the voltage signal constant and reading the distance, or keeping the distance constant and reading ths signal.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. Apparatus for non-contact, accurate and continuous determination of the temperature on a surface comprising:
   temperature detecting means,
   and distance measuring means for continuously measuring the distance between said surface and said temperature detecting means,
   wherein said temperature detecting means and said distance measuring means are arranged together to form a measuring probe spaced from said surface for simultaneously detecting the temperature of a spot on the surface and the distance of the probe from the spot, and
   wherein signal line means are provided for said distance measuring means and said temperature detecting means for supplying signals representative of the instantaneous distance measured and temperature detected to analyser means positioned remotely of said probe, said analyser means compensating the detected temperature signal in accordance with the instantaneous distance signal so as to provide an accurate determination of the temperature of the spot on the surface.

2. Apparatus according to claim 1,
   wherein the measuring probe is substantially immovable relative to the surface during measurements of the surface with the probe.

3. Apparatus according to claim 1, wherein said distance measuring means includes at least one of capacitive and inductive measuring elements.

4. Apparatus according to claim 1, wherein said distance measuring means and said temperature detecting means are arranged in said measuring probe concentrically with respect to one another.

5. Apparatus according to claim 4, wherein said surface is on a movable part having contrast markings, further comprising photo-electric measuring means for measuring the speed of movement of said movable part.

6. Apparatus according to claim 5, wherein said photo-electric measuring means includes a light conductor having a light path concentric with both of said distance measuring means and said temperature detecting means.

7. Apparatus according to claim 1, wherein said distance measuring means includes an annular shaped inductive measuring element, wherein said temperature detecting means includes an annular shaped temperature detector arranged concentrically with respect to said inductive measuring element, said annular shaped temperature detector and said annular shaped inductive measuring element being fixed in position relative to one another in said measuring probe, said measuring probe being configured such that said annular shaped temperature detector and said annular shaped inductive measuring element are spaced equally from said surface.

8. Apparatus according to claim 1, wherein said distance measuring means and said temperature detecting means are in fixed positions with respect to one another in said probe.

9. Apparatus according to claim 8, further comprising mounting means for mounting said probe in position with respect to said surface, said mounting means including distance varying means for varying the distance between said probe and said surface.

10. Apparatus according to claim 9, wherein said distance varying means includes adjusting means for adjusting the position of said probe with respect to a fixed part spaced from said surface, said adjusting means including indicating means for indicating the adjusted position of said probe.

11. Apparatus according to claim 10, wherein said adjusting means is a micrometer screw means attached at both said fixed part and said probe.

12. Apparatus according to claim 9, wherein said surface is on a rotating member.

13. Apparatus according to claim 10, wherein said fixed part is a wall of a housing for a gas ultracentrifuge, and wherein said surface is on a rotatable centrifuge rotor of said ultracentrifuge, and wherein seal means are provided for sealing the interior of the housing in the area of the probe.

14. Apparatus according to claim 9, wherein said distance varying means includes shim means positionable between a fixed part spaced from said surface and a part movable with said probe.

15. Apparatus according to claim 10, wherein said fixed part is a wall of a housing which surrounds the member having said surface, wherein said mounting means includes means for supporting said probe at said wall with the distance measuring means and temperature detecting means on the side of said wall facing said surface and with the adjusting means on the side of said wall facing away from said surface.

16. Apparatus according to claim 15, wherein said adjusting means is a micrometer screw means attached at both said fixed part and said probe.

17. Apparatus according to claim 16, wherein said surface is on a rotatable centrifuge rotor of a gas ultracentrifuge housed by said housing, and wherein seal means are provided for sealing the interior of the housing with respect to the exterior thereof adjacent said probe.

18. Apparatus according to claim 16, wherein signal line means extend from each of said distance measuring means and said temperature detecting means for supplying signals representative of the instantaneous distance measured and temperature detected to analyser means positioned remotely of said probe.

19. Apparatus according to claim 18, wherein means are provided for connecting one of said signal line means leading from said distance measuring means to a plurality of separate units which utilize the signal therein.

20. Apparatus according to claim 15, wherein said mounting means includes a sliding member detachably and rigidly connectable with said probe for movement therewith and a flange detachably connectable to the side of said wall facing away from said surface, said wall having a through opening, said flange having a through opening which is aligned with said through opening in said wall when said flange is connected to the side of said wall, the through opening in said flange being configured to accommodate said sliding member such that said sliding member is supported by said flange and is slidably movable in a linear direction at said flange.

21. Apparatus according to claim 20, wherein said adjusting means is a micrometer screw means attached at both said fixed part and said probe.

22. Apparatus according to claim 21, wherein said micrometer screw means includes a first part movable with said sliding member and a second part immovably supported at said flange by way of spring means and ball means.

23. Apparatus according to claim 21, wherein signal line means extend from each of said distance measuring means and said temperature detecting means for supplying signals representative of the instantaneous distance measured and temperature detected to analyser means positioned remotely of said probe.

24. Apparatus according to claim 1, wherein said surface is on a rotating member.

25. Apparatus according to claim 1, wherein means are provided for supplying an output signal from said distance measuring means to a plurality of separate and independently functioning means which utilize the signal.

26. Apparatus according to claim 1, wherein said distance measuring means includes a capacitive measuring element, and wherein said temperature detecting means includes a temperature detecting element attached at said capacitive measuring element.

27. Apparatus according to claim 1, wherein said probe exhibits a substantially flat circular surface portion in facing relationship to said surface, and surface portion containing elements of both said temperature detecting means and said distance measuring means.

28. Apparatus acccording to claim 1, wherein said surface is on a movable part having contrast markings, further comprising photo-electric measuring means for measuring the speed of movement of said movable part.

29. Apparatus according to claim 28, wherein said moving part is a rotor of a gas centrifuge, and wherein said structural unit is sealed in a wall forming part of a housing for said rotor.

30. Apparatus according to claim 28, wherein said photo-electric measuring means includes a light source, light conducting means having one end terminating at a position spaced from and in facing relationship to said movable part and the other end terminating at the light source, a light receiver at the same end of the light conducting means as the light source, a scanning unit jointly accommodating said light source and light receiver, and wherein said one end of said light conducting means forms a structural unit together with said distance measuring means and said temperature detecting means.

31. Apparatus according to claim 30, wherein said moving part is a rotor of a gas centrifuge, and wherein said wall forms part of a housing for said rotor.

32. Apparatus according to claim 23, wherein said light conducting means include light conducting elements combined into a single light conductor having an end face at said one end in facing relationship to said surface on said movable part, wherein detecting elements of both said temperature detecting means and distance measuring means are arranged at said end face of said light conductor such that the distance measuring means, the photo-electric measuring means, and the temperature detecting means all face the same point on said surface at a given instant.

33. Apparatus according to claim 30, wherein said distance measuring means is arranged annularly around the end of said light conducting means in facing relationship to said moving part.

34. Apparatus according to claim 30, wherein said distance measuring means includes an annular shaped inductive measuring element, wherein said temperature detecting means includes an annular shaped temperature detector arranged concentrically with respect to said inductive measuring element, said annular shaped temperature detector and said annular shaped inductive measuring element being fixed in position relative to one another in said measuring probe, said measuring probe being configured such that said annular shaped temperature detector and said annular shaped inductive measuring element are spaced equally from said surface, and wherein said light conducting means is in alignment with a central opening in said probe concentric to said inductive measuring element and said temperature detector.

35. Apparatus according to claim 30, wherein means are provided for varying the distance between the moving part and said structural unit.

36. Apparatus according to claim 30, wherein said structural unit is sealed into a wall adjacent said movable part with said one end of said light conductor and said distance measuring means and temperature detecting means at the side of the wall which faces the movable part, and wherein the light conductor means and signal lines from said temperature detecting means and distance measuring means penetrate the wall through gas-tight passages within the structural unit.

37. Apparatus according to claim 36, wherein said distance measuring means is arranged annularly around the end of said light conducting means in facing relationship to said moving part.

38. Apparatus according to claim 37, wherein means are provided for varying the distance between the moving part and said structural unit.

39. Apparatus according to claim 36, wherein said distance measuring means includes an annular shaped inductive measuring element, wherein said temperature detecting means includes an annular shaped temperature detector arranged concentrically with respect to said inductive measuring element, said annular shaped temperature detector and said annular shaped inductive measuring element being fixed in position relative to one another in said measuring probe, said measuring probe being configured such that said annular shaped temperature detector and said annular shaped inductive measuring element are spaced equally from said surface, and wherein said light conducting means is in alignment with a central opening in said probe concentric to said inductive measuring element and said temperature detector.

40. Apparatus according to claim 36, wherein said light conducting means include light conducting elements combined into a single light conductor having an end face at said one end in facing relationship to said surface on said movable part, wherein detecting elements of both said temperature detecting means and distance measuring means are arranged at said end face of said light conductor such that the distance measuring means, the photo-electric measuring means, and the temperature detecting means all face the same point on said surface at a given instant.

41. Apparatus according to claim 40, wherein means are provided for varying the distance between the moving part and said one end face of said light conductor.

42. Apparatus according to claim 30, wherein the speed measurment, the distance measurement and a temperature measurement from said temperature detecting means are fed to a common means for utilizing such signals.

* * * * *